April 27, 1965
W. L. FRESEMAN ETAL
3,181,076
CLIPPING CIRCUIT EMPLOYING TWO TUBES COUPLED TOGETHER BY DIODE
IMPEDANCE NETWORK AND VARIABLE BIAS CONTROL MEANS
Original Filed Aug. 12, 1960
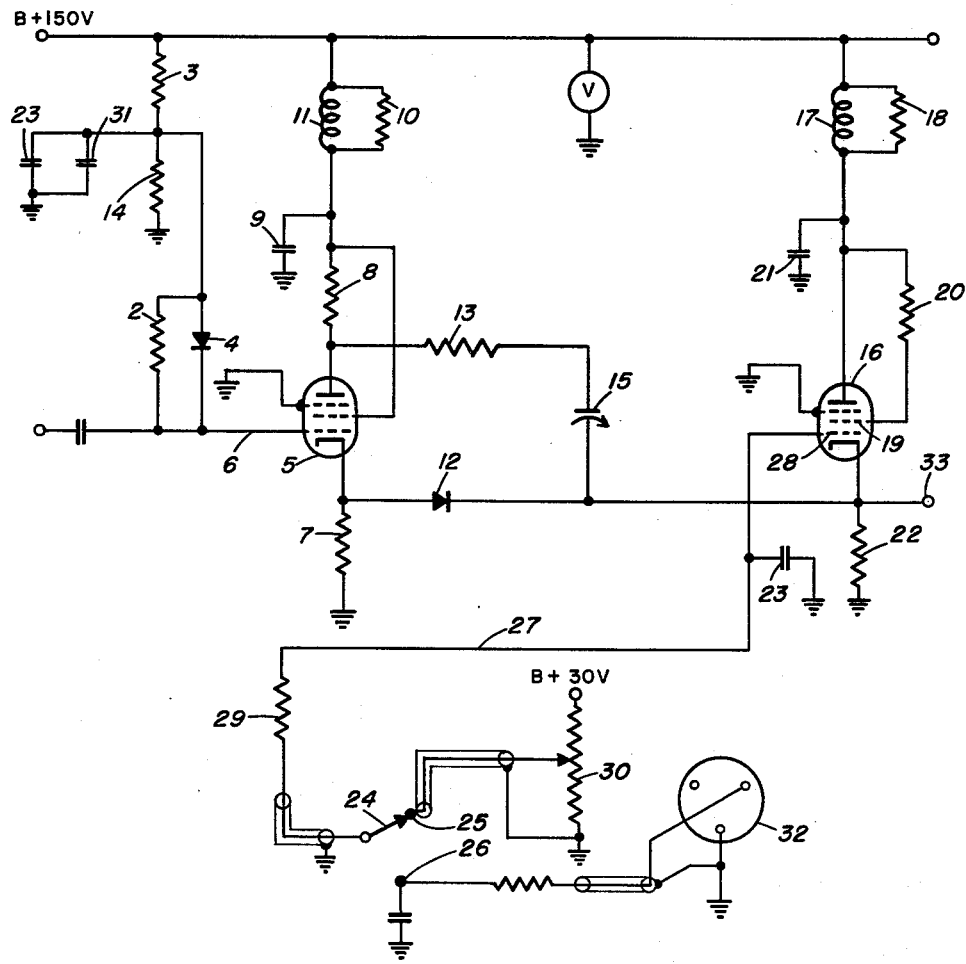
INVENTORS
WILLIAM L. FRESEMAN
FRANK H. STEPHANS, JR.
BY Claude Funkhouser
ATTORNEY
R. R. Anderson
AGENT

United States Patent Office 3,181,076
Patented Apr. 27, 1965

3,181,076
CLIPPING CIRCUIT EMPLOYING TWO TUBES COUPLED TOGETHER BY DIODE IMPEDANCE NETWORK AND VARIABLE BIAS CONTROL MEANS
William L. Freseman, New York, N.Y., and Frank H. Stephens, Jr., Coral Gables, Fla., assignors, by mesne assignments, to the United States of America as represented by the Secretary of the Navy
Original application Aug. 12, 1960, Ser. No. 49,398. Divided and this application Nov. 7, 1963, Ser. No. 322,261
9 Claims. (Cl. 328—171)

The present invention relates to a clipping circuit and more particularly to a clipper-selector circuit which is capable of functioning on very fast waveforms and which provides base-clipping without feed-through when cut off.

This is a divisional case of Serial No. 49,398, filed August 12, 1960, for an Iso-Echo Contour Device.

As is well known in the electrical art, a clipping circuit is employed for amplitude selection between predetermined limits, i.e., the selection of all values of an input or output signal greater or less than predetermined reference levels or lying between an upper and a lower reference level. The output waveform generally has a flat top or bottom or both, depending upon whether the upper or lower limit is to be clipped.

While the clipper-selector circuit making up the present invention may be used in a variety of devices such as magnetic amplifiers, power amplifiers, and the like, it has been most effectively employed in an iso-echo contour device. An iso-echo contour device, as familiarly known in the art, is a device which is used in a variety of ways to accomplish such things as to study the structure of meteorological phenomena, with a radar system for mapping, geographical exploration, military surveillance and intelligence operations, by effecting a video inversion or cancellation of signal of all parts of the target which return a signal strength above a predetermined level. Ordinary radar weather systems are capable of distinguishing clearly only between rain and no-rain, and a P.P.I. presentation derived from such systems showed only white areas for rain and black areas for no-rain. Prior art iso-echo contour circuits have been provided with clipping means to clip the highest peaks of the return video signal and means to generate a blanking pulse to turn off the cathode ray tube in the P.P.I. display during peak signals. Thus, a white area on the cathode ray tube indicating an area of some rainfall would have black patch, or "hole," indicating an area of high rainfall. However, such a black center would be indistinguishable from a black patch indicating no rain at all, resulting in inaccurate presentation.

An improvement over the prior art iso-echo systems, of which the clipper-selector circuit of the present invention comprises a vital component, accomplishes an effective video inversion or cancellation of all signals above a predetermined level, which inversion level can be varied either manually or automatically by pre-arranged fixed steps. It is clear, therefore, that the clipper-selector plays an important part in the efficient and effective operation of the iso-echo device and the required clipper must be one which accurately selects the well defined clipping levels, which is capable of functioning on very fast waveforms as used in radar circuits, as well as one which permits no feed-through when the stage operates to cut off the portion of the incoming video signal.

It is an object of the present invention to provide a clipping circuit which is capable of acting on very fast waveforms.

Another object is the provision of a clipping circuit which offers base clipping without feed-through when the circuit is cut off.

Still another object is the provision of a clipping circuit which is particularly efficient and effective in accomplishing a clipping function between desired limits.

Yet another object is the provision of a clipping circuit wherein the clipping level may be altered either manually or automatically.

A further object is the provision of a clipping circuit wherein the clipping level may be altered in equal steps as desired.

A still further object is the provision of a clipping circuit which eliminates feed-through by means of a unique resistance-capacitance network.

Other objects and many of the attendant advantages of this invention will be readily appreciated as the same becomes better understood by reference to the following detailed description when considered in connection with the accompanying drawings wherein:

FIG. 1 shows a circuit diagram of the clipping circuit.

Referring now to the single figure of the drawing there is shown a pentode tube 5 having a signal input lead 6 connected to its control grid and a cathode resistor 7 located between the cathode and ground. Connected between a source of positive potential and ground, to thereby form a voltage divider, are two resistances 3 and 14. At the junction of resistances 3 and 14, and tied to ground is a bypass network consisting of two parallel connected capacitances 23 and 31. Also connected to the junction of resistances 3 and 14 and terminating at input lead 6 is a diode 4 which is poled to conduct toward input lead 6. The diode 4 is shown here as a semi-conductor, but it is to be understood that any other type diode will function just as effectively. A resistance 2 is connected in parallel across diode 4 and serves to limit the high impedance state of the diode, as will be more fully explained hereinafter.

A plate load resistor 8 and a series connected parallel circuit 10–11 connect the plate of the tube 5 to a source of B+ potential while the suppressor grid is connected directly to ground and the screen grid is tied to the upper end of resistance 8. The parallel circuit 10, 11 serves to cut out parasitic oscillations from the stage. A bypass condenser 9 is connected to ground at the top end of resistance 8. Joined at the upper end of cathode resistance 7, in a typical cathode follower arrangement, is a diode 12, which functions as a compensated wide-band clipper, as will be more fully described hereinafter.

Connected to the plate of tube 5 and terminating at the forward plate of diode 12 is an impedance network, shown here as series connected resistance 13 and capacitance 15, although similar networks would be satisfactory. The capacitance 15 is shown as being adjustable to thereby determine the amount of current which flows through this branch of the circuit.

Following stage 5 is another pentode 16, having its plate tied to the B+ potential through a parallel circuit comprising a choke coil 17 and resistance 18. This parallel circuit also functions to suppress parasitic oscillations in tube 16 just as 10, 11 does in tube 5. The suppressor grid of tube 16 is tied directly to ground while the screen grid 19 utilizes a dropping or suppressing resistance 20 to isolate the screen 19 from the circuit at possible parasitic frequency oscillation, the upper end of the resistance 20 being tied to ground through bypass condenser 21. The output of stage 5, as determined by the compensated wideband clipper 12, is fed to stage 16 by a direct connection to the cathode of stage 16, this cathode being tied to ground through cathode resistance 22.

The clipping level at which the invention operates is made adjustable by the provision of both manual or automatic means, selected through the operation of a two position switch having an arm 24 and fixed contacts 25 and 26. Switch arm 24 is connected by means of lead 27 and series resistor 29 to the control grid 28 of pentode 16 so as to regulate the operation of that tube and therefore set the clipping level of the circuit. Manual adjustment of the clipping level is determined by the setting of a potentiometer 30 connected to a 30 volt B+ source of positive potential. Fixed contact 25 connects directly to the movable arm of potentiometer 30. Fixed contact 26 is connected to a multi-contact plug, such as 32, which may lead to some form of automatic switching device, not shown.

The output of the clipping circuit is produced at output terminal 33, where it may be fed to any suitable utilization circuit, such as, for example, the iso-echo contour circuit previously described herein.

Turning now to the operation of the invention, a signal, a portion of whose amplitude it is desirable to clip off above a preselected level, and which for the sake of illustration is considered as a positive-going video signal, is applied to the grid of clipper driver pentode 5 by means of lead 6, where its base line is referred to a D.C. level at the cathode of tube 5 by diode 4 functioning as a D.C. restorer. The compensated wideband clipper selector, diode 12, has connected between its output terminal and the anode of tube 5 a resistance-capacitance network comprising resistance 13 in series with adjustable capacitance 15. This resistance-capacitance network in the anode circuit of tube 5, in operation, feeds an out-of-phase signal around clipper-selector 12 to compensate for capacitive and resistive leakage through diode 12 when it is in a non-conducting state, thereby immeasurably enhancing the action of the clipper selector diode 12 at high frequencies. It is common knowledge that no diode is so perfectly constructed that there will be absolutely no leakage across its elements when it is in a cut-off state. Therefore, the resistance-capacitance (13, 15) arrangement serves a most vital function in the operation of the clipper diode 12 by offsetting this undesirable leakage by means of an equal and opposite out-of-phase signal fed around the diode so that it cancels the leakage. Capacitance 15 is made adjustable so that exact cancellation may be accomplished.

The compensated wideband clipper-selector 12 is biased by clipping level selector pentode 16 so that it will pass only signals above a certain amplitude, while rejecting completely those portions below the chosen level. The amount of bias applied to the control grid 28 of pentode 16, and therefore the extent of clipping obtained by clipper-selector 12, is controlled by the position of switch 24 which applies a voltage from either the manually operated potentiometer 30 or from an automatically operated supply source through multi-contact plug 32. When the switch is in position to complete a circuit through contact 25, then potentiometer 30 is connected by means of lead 27 to grid 28, resulting in manual adjustment of the bias on pentode 16 through manual movement of the slider on potentiometer 30. The alternate position of switch 24, namely when a circuit is completed through contact 26, connects pentode 16 with multi-contact plug 32 which can lead to any well known automatic switching means (not shown) as a stepping switch, or the like, which will provide the desired voltages to bias tube 16.

It should be noted that for the sake of simplicity only one potentiometer 30 is illustrated, while in fact any number may be employed, depending on the number of successive interim steps desired between the extremes of full and no signal clipping.

From the above description of the invention, and its mode of operation, it is clear that there is provided a novel, compensated clipper selector circuit which has wideband characteristics, which is capable of operating on very fast waveforms, one which offers base clipping without feed-through when the circuit is not in operation, and one which is easily adjusted to vary the clipping level.

Obviously many modifications and variations of the present invention are possible in the light of the above teachings. It is therefore to be understood that within the scope of the appended claims the invention may be practiced otherwise than as specifically described.

What is claimed is:

1. A compensated wideband clipping circuit comprising
 a first electron device having at least a plate, cathode, and control grid;
 a second electron device having at least a plate, cathode, and control grid;
 a unidirectional current controlling means having input and output terminals connected between the cathodes of said first and second electron devices;
 an impedance network connected between the anode of the first electron device and the output terminal of the current controlling means; and
 means for adjusting the control grid bias on the second electron device;
 said bias adjustment determining the clipping level.

2. A compensated wideband clipping circuit comprising
 a first electron tube having at least a plate, cathode, and control grid;
 a second electron tube having at least a plate, cathode, and control grid;
 a diode having an input and an output joining the cathodes of said tubes;
 an impedance network connected between the anode of the first tube and the output of the diode; and
 bias determining means connected to the control grid of the second tube whereby the bias setting regulates the clipping level.

3. A compensated wideband clipping circuit comprising
 a first electron device having at least a plate, cathode, and control grid;
 a D.C. restorer connected to the control grid of the first electron device;
 a second electron device having at least a plate, cathode, and control grid;
 a unidirectional current controlling device connected between the cathodes of the first and second electron devices; and
 bias determining means connected to the control grid of the second electron device whereby the bias setting controls the clipping level.

4. The compensated wideband clipping circuit of claim 3 wherein the D.C. restorer comprises
 a diode poled to conduct toward the control grid of the first electron device;
 a voltage divider connected in series with the diode and used as a potential source for the diode; and
 a resistance connected in parallel across the diode.

5. A compensated wideband clipping circuit comprising
 a first electron tube having at least a plate, cathode, and control grid;
 a D.C. restorer connected to the control grid of the first electron tube;
 an input lead also connected to the control grid of the first electron tube;
 a second electron tube having at least a plate, cathode, and control grid;
 a unidirectional current controlling means having input and output terminals connected between the cathodes of the first and second electron tubes;
 an impedance network connected between the anode of the first electron tube and the output terminal of the unidirectional current controlling means; and
 bias determining means connected to the control grid of the second electron tube whereby the setting of the bias determining means determines the clipping level of the circuit.

6. The compensated wideband clipping circuit as defined in claim 5 wherein the impedance network comprises
- a resistance connected to the anode of the first electron tube;
- another resistance connected to the anode of the first electron tube; and
- a capacitance connected between the other resistance and the output terminal of the unidirectional current controlling means.

7. The compensated wideband clipping circuit as defined in claim 5 wherein the bias determining means comprises
- a two-position switch connected to the control grid of the second electron tube;
- manually adjustable means connected to one set of contacts of the switch; and
- automatically adjustable means connected to the other set of contacts of the switch.

8. The wideband clipping circuit as defined in claim 7 wherein the manually adjustable means comprises
- an adjustable potentiometer connected between the switch and a source of potential.

9. A compensated wideband clipping circuit comprising
- a first electron tube having at least a plate, cathode, and control grid;
- an input lead connected to the control grid of the first electron tube;
- a first diode connected to and poled to conduct toward the control grid of the first tube;
- a voltage divider in series with the diode for supplying potential thereto;
- a first resistance connected in parallel with the first diode;
- a second electron tube having at least a plate, cathode, and control grid;
- a second diode connected between the cathodes of the first and second electron tubes and poled to conduct toward the second tube;
- a second resistance connected to the anode of the first electron tube;
- a third resistance also connected to the anode of the first electron tube;
- a capacitance connected between the third resistance and the output of the second diode;
- a multi-position switch connected to the control grid of the second electron tube;
- an adjustable potentiometer connected to one set of contacts of the switch for manually adjusting the bias on the second electron tube; and
- an automatic adjustable means connected to another set of contacts of the switch for alternately adjusting the bias on the second electron tube whereby the bias setting on the second electron tube determines the clipping level of the clipping circuit.

References Cited by the Examiner

UNITED STATES PATENTS

| | | | |
|---|---|---|---|
| 2,761,130 | 8/56 | Kibler | 307—88.5 |
| 2,836,714 | 5/58 | Andrews | 328—171 |
| 3,031,623 | 4/62 | Custin et al. | 307—88.5 |

FOREIGN PATENTS 568,110  12/58  Canada.

ARTHUR GAUSS, *Primary Examiner.*